United States Patent
Munk (10) Patent No.: US 6,432,367 B1
(45) Date of Patent: *Aug. 13, 2002

(54) INDOOR AIR QUALITY GAS PHASE RETURN AIR CLEANER

(76) Inventor: Michael Munk, 130 Gun Club Rd., Stamford, CT (US) 06903

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,979

(22) Filed: Feb. 26, 1998

Related U.S. Application Data (60) Provisional application No. 60/039,263, filed on Feb. 28, 1997.

(51) Int. Cl.[7] .............................................. B01D 47/06
(52) U.S. Cl. .................. 422/171; 422/168; 422/169; 422/170; 422/172; 422/108; 422/110
(58) Field of Search ................................ 422/108, 110, 422/111, 107, 105, 114, 124, 122, 123, 168, 169, 170, 171, 172; 62/176.4; 96/244, 251, 261, 267, 413, 417; 261/DIG. 48, DIG. 78

(56) References Cited

U.S. PATENT DOCUMENTS

| | | | |
|---|---|---|---|
| 3,006,436 A | * 10/1961 | Starbuck et al. | 96/300 |
| 4,042,016 A | 8/1977 | Boochever et al. | 165/20 |
| 4,058,253 A | 11/1977 | Munk et al. | 236/46 R |
| 4,118,945 A | 10/1978 | Boochever et al. | 62/176 C |
| 4,564,375 A | 1/1986 | Munk et al. | 96/364 |
| 4,667,465 A | 5/1987 | Munk | 60/39.3 |
| 4,702,074 A | 10/1987 | Munk | 60/39.511 |
| 4,731,988 A | 3/1988 | Munk | 60/39.3 |
| 4,731,990 A | 3/1988 | Munk | 60/39.05 |
| 4,773,846 A | 9/1988 | Munk | 431/4 |
| 4,844,874 A | * 7/1989 | DeVries | 423/210 |
| 4,986,937 A | * 1/1991 | Sorio | 261/81 |
| 5,277,707 A | 1/1994 | Munk et al. | 95/8 |
| 5,326,254 A | 7/1994 | Munk | 431/115 |
| 5,389,120 A | * 2/1995 | Sewell et al. | 96/233 |
| 5,454,518 A | 10/1995 | Munk | 239/431 |
| 5,501,401 A | 3/1996 | Munk | 239/431 |
| 5,531,800 A | * 7/1996 | Sewell et al. | 96/233 |
| 5,531,801 A | * 7/1996 | Sewell et al. | 96/233 |

* cited by examiner

Primary Examiner—Hien Tran
(74) Attorney, Agent, or Firm—Martin Novack (57) ABSTRACT

Enclosed workplaces within a building are kept habitable by a central HVAC (heating, ventilating and air conditioning) system. These systems are designed and operated in accordance with professional standards-of-care promulgated by ASHRAE (American Society of Heating, Refrigeration and Air Conditioning Engineers), the ASHRAE 62-1989 Standard. An intent of the Standard is to preclude the recirculation of contaminants which, without mitigation, degrade indoor air quality. The disclosure is directed to an insertion module for installation in the return air path of an HVAC system that includes first and second stages that reduce nitrogen dioxide and ozone contaminants, in a gas-to-gas dry process reaction, to set point controlled levels in the return air.

4 Claims, 7 Drawing Sheets

INDOOR AIR QUALITY GAS PHASE RETURN AIR CLEANER

RELATED APPLICATION

This application claims priority from U.S. Provisional Patent Application 60/039,263, filed Feb. 28, 1997, and said Provisional Patent Application is incorporated herein by reference.

FIELD OF THE INVENTION

This invention relates to the field of air conditioning and cleaning and, more particularly, to improved indoor air cleaning methods and systems for compliance with National Indoor Air Quality Standard ANSI/ASHRAE 62-1989.

BACKGROUND OF THE INVENTION

The World Health Organization furnishes data showing measured levels of up to 0.4 mg/m$^3$ of ozone and 1.0 mg/m$^3$ for $NO_2$ in workplace indoor air which is well over the acceptable limits for ozone and approaching acceptability level for $NO_2$. When one considers the known ability of commonplace office equipment to produce such gases through the ionization of air within the equipment, one can readily appreciate that improvements in indoor air cleaning are needed to meet the levels set forth in the Standard.

Those familiar with the production of ozone for commercial purposes are aware that in addition to ozone the equipment also produces nitrogen oxide and nitrogen dioxides through the same ionization process which produces ozone. It is equally well known that electronic equipment, which has become so common to the office worker environment, produces ozone in a similar fashion as the IEEE requires certification that equipment produced according to it protocols is certified to emit no more than 0.1 ppm of ozone.

SUMMARY OF THE INVENTION

The invention disclosed herein is a two stage air cleaner configured to control levels of both ozone and nitrogen dioxide concentrations where such air contaminants are propagated within the workplace to preclude substantially degradation of indoor air quality provided by HVAC (heating-venting-and air conditioning) systems. These pollutants are known to be propagated through the use of electronic equipment and operations which ionize air within workplaces which use such equipment.

The invention operates in a unique sequential manner upon air induced through its intake section wherein water droplets are initially intimately mixed with contaminated air, to absorb any soluble nitrogen dioxide conveyed within the airstream and then, once the air has been suitably mixed into a drier, but higher humidity controlled condition, through the evaporation of all free moisture suitable to react its ozone content. Continuous mixing, as taught herein, in a mariner which assures adequate molecular contacts between ozone and molecular water for a gas-to-gas phase reaction to replicate a process known to quench ozone. Hence, ionized gas contaminants of an air stream traveling through the inventions envelope specifically engineered to assure the transfer of the electronic charge of the ionized gases to the grounding path which the invention's enclosure provides is cleaned of the cited pollutants.

This two step air cleaning process is new art uniquely created to satisfy the ANSI/ASHRAE 62-1989, Indoor Air Quality Standard which governs what is, and is what is not acceptable workplace air quality with respect to the ionized gases produced within the workplace, which otherwise would render that air unsuitable for recirculation through standard HVAC (heating-ventilating and air conditioning) system configurations. ASHRAE 62-1989, the American Society Of Heating, Air Conditioning and Refrigeration Engineers, is the peer group professional society charged with responsibilities for establishing standards of practice for those who design, construct, maintain and manage buildings.

Figure 1:
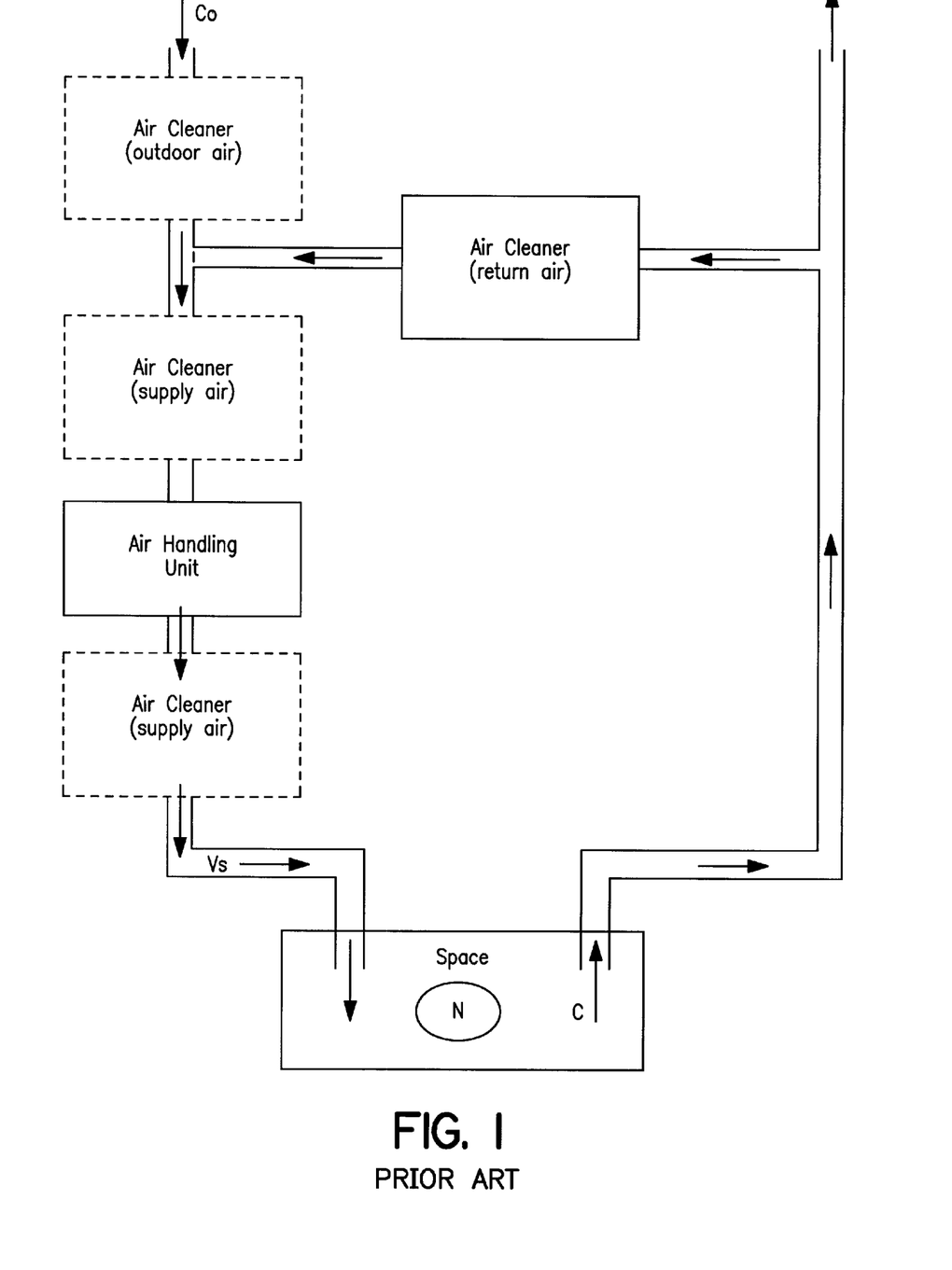
FIG. 1 is a system diagram from ASHRAE, showing contamination source and possible location for air cleansers. In the diagram, Vs denotes supply air, N denotes quantitative contaminant source, and C denotes contaminant concentration within return air. (In the invention hereof, the return air cleaner location is selected as optimum location for reacting ionized gases propagated by source N, causing contaminant concentration C to preclude cycles-of-concentration contamination or Vs by treating the minimum quantity of system air within a reaction favorable psychometric environment.)

The ANSI/ASHRAE 62-1989 Standard publishes limits for commonly known building pollutants, as concentrations listed within its Table C-1, lists the ozone and nitrogen dioxide permissible exposure limits along with many other potential pollutants. FIG. 1, as reproduced from the Standard shows possible locations to which an air cleaning device may be applied. The alternate methodology for controlling pollutants specified within the Standard relies on increasing ambient air rates to purge pollutants to the acceptable levels through dilution. The invention applies the principles of air cleaning only to the return air cleaning task as the most effective way of achieving compliance with the Standard with respect to the ionized gases which have been cited as common to workplace usage.

FIG. 1 also illustrates an occupancy wherein a source generates a pollutant and how the invented return air cleaner is applied to mitigate, or otherwise remove the pollutants to preclude the reintroduction of the contaminated air back into the occupancy. While the invention is one of many air cleaners which might be applied, it is specific only to ionized gases as previously cited. Without application of the invention, not only would the source emissions increase, but any recycled ones as well, through cycles-of-concentration. Cycles-of-concentration result from the recirculation of HVAC system air operated to minimize the costs associated with heating and cooling the large air masses required to comfort condition and ventilate workplaces served by central HVAC systems.

Hence, the return air cleaner, as set forth herein, will react the ionized gases out of the return air stream which acts to zero-out the complex cycles of concentration component of the indoor air ability equations of Appendix E of the Standard.

While the invention deals with nitrogen dioxide, a primary focus is on the ozone which invariably accompanies nitrogen dioxide, both gases being formed from an ionization process and not products of combustion which are considered the usual source of nitrogen dioxide. Current OSHA labor law cites ozone at 0.1 ppm as the TWA exposure limit. Nitrogen dioxide is similarly limited to 5.0 ppm at present. Hence, control of ozone level is one of the invention's primary objectives because the World Health Organization has published detection levels of up to 0.2 ppm of ozone measured as a building air quality pollutant.

ASHRAE has documented that ozone propagation is directly related to the concentration of water molecules which act to inhibit the ionization process as have the manufacturers of commercial ozone generators and these have provided key factors in developing the invented return air cleaner.

The invented return air cleaner acts to control ozone levels in a two fold manner. First, by inerting the ionized gases traveling through the return-air-cleaner (RAC). A direct control mechanism. Second, by reducing the propagation rate of the electronic equipment located within the occupancies through the elevated moisture content of the substantial recirculated air component which has been mixed with ambient ventilation air in accordance with the teachings of the Standard itself. An indirect control mechanism.

It is the sum total of both of these effects which is needed to control the level of ozone within the workplace served by the HVAC system within which the return air cleaner is applied.

In general the commercial and industrial HVAC systems in use today circulate a thermally conditioned air stream composed of 75 to 80% recirculated air and 20 to 25%, ambient air sourced ventilation air. This invention is particularly suitable to upgrade such HVAC systems for compliance with ANSI/ASHRAE 62-1989 by controlling cleaning rates to what are the currently documented safe occupancy exposure levels of these gases. Hence, the invention disclosed herein is a return air cleaner applied in accordance with the teachings of the Standard which can become the optimum technology to satisfy the requirements of the Standard. Cleaning the air from office type occupancies by making it safe for recirculation in quantities of about 80% of the entire air mass distributed by the HVAC systems to maintain safe and healthy workplaces with acceptable indoor air quality as defined by the ANSI/ASHRAE Standard with respect to ozone.

The invented RAC is the alternate technology to dilution ventilation which can be energy intensive as compared to working with the respective dilution rate formulas of the Standard. Such comparison reveals that a RAC application substantially diminishes ventilation rates to those established within the Standard and promises to be the most cost effective solution to mitigating pollutants which result from the ionization of air into the hazardous gases listed in Table C-1.

In examining Table C-1, of particular concern are nitrogen dioxide and ozone which are specified as safe at relatively low concentrations with 5 ppm and 0.1 ppm being the respective limiting values. In June of 1997, ozone limits were lowered by the EPA from the cited 0.1 to 0.08 ppm and it can be anticipated that ANSI/ASHRAE 62-1989 will adopt this lowered limit, as the Standard speaks to acceptable indoor air quality being no worse than that of the ambient.

Since the EPA proposed even lower levels than its 0.08 ppm ozone "compromise" value, the need exists and the invention provides for complying with ever reduced limits for ozone within breathing/breathable air within the manufactured environment provided by central HVAC systems.

The invented RAC-FOG equipment provides for necessary variation in compliance levels as it incorporates sense and feed back controls which enable it to control ozone removals from an air stream to an addressable setpoint as measured within the occupancy wherein ozone propagation rates vary and within the ducting downstream of the RAC unit exit. In this manner the invention can respond to the wide range of variables affecting both the psychometric and usage variables related to the propagation of ozone, as well as any ambient air ozone pollutants which could increase in concentration through recirculation.

The use of the invented RAC (return air cleaner) as a gas to gas phase cleaner is needed because at present there is no commercial, at market cleaner which can deal effectively with both of these gases other than charcoal absorption. Hence, a need has arisen to devise one which can deal equally well with both of these gases and thusly meet the needs of the return air cleaning task ANSI/ASHRAE 62-1989.

Ozone is a molecule consisting of positively charged oxygen atoms and is rapidly quenched by the concentration of water in its molecular (gaseous) state. Sustained molecular impacts between the gases quickly bleeds down the charge carried by the unstable ozone molecule and with well established ground paths through the unit housing can quickly react the ozone our of the air stream.

While ozone is relatively insoluble with respect to water, it decays in direct proportion to the concentration of water molecules within the overall air volume of the air/ozone/water molecule mixture propagated within the units mixing zone. This is a gas-to-gas phase reaction which will react all ozone molecules once the concentration rises above the 80% of saturation water vapor concentration as demonstrated by both ASHRAE research and by those who have observed the quick vanishing of ozone propagated during thunderstorms.

The ozone production industry furnishes an ionization constant of 93 $\mu$/watt-hour for ozone production within very dry air. Conversely, virtually no ozone output occurs in air at 80% of air stream saturation, at saturation temperature molecular water vapor concentrations. ASHRAE teaches that the relationship between these cited endpoints is linear. Hence, the invention which moistens air on an ETD (evaporation-to-dryness) basis, to a moisture content of at least 80%, which defines RH (relative humidity) came to be made.

$NO_2$ (nitrogen dioxide), is produced through an ionization constant of 167 $\mu$gm/watt-hour under similar circumstance. $NO_2$ is well known to react upon contacting water into nitric acid. That reaction is instantaneous. While a gas to gas reaction also occurs, as is well documented in the formation of acid rain within ambient air, this reaction is a much slower hydrolysis reaction. Hence, a mechanism which forces mixing, or an equivalent wetted impaction surface film, to cause intimate contact between $NO_2$ gas molecules and water, which is a requirement for the RAC invention. An air cleaner which provides a contact water surface as either a film or droplets will capture $NO_2$ out of the airstream and into the water as dilute nitric acid, or in the case of an atomized liquid humidification process, nitric acid vapor is left airborne, after the water content of the droplet as evaporated, is new art with respect to HVAC applications.

When a water supply with even a relatively small or low hardness (alkalinity from dissolved minerals normally calcium or sodium, complexed ions) as in common to almost any municipal domestic water source, is used the alkalinity of the evaporating water droplet increases as the third power of the evaporating droplet radius. Hence, the alkalinity of the droplet grows very rapidly and with rising pH precipitates what was the nitric acid component of the water droplet into a post evaporation nitrate, "humidifier dust", in the presence of adequate mixing, as provided for within the invention. Such humidifier dust particulates are readily captured by filters, within the efficiency range specified by ASHRAE 62-1989 as required for use within the air handler of FIG. 1. Thus the return air cleaner (RAC), invented herein, need have no internal filters of its own.

The essentials of the invented RAC, as applied to its task of return air cleaning requires a sequential arrangement of its two stages packaged within a single housing to be inserted within the ducting which connects an occupancy with its heating, ventilating and air conditioning unit through its air return path.

Stage One, is a moistening and mixing process which assures that the entering contaminated air stream carrying ozone and $NO_2$ is intimately mixed with water droplets or impacted upon a water film, both being well known for air stream scrubbing processes, for conversion of the $NO_2$, a gas into $HNO_3$, nitric acid, a liquid dissolved within water which is readily capturable. This is a liquid to gas reaction phase which captures highly soluble $NO_2$ but does nothing for the insoluble ozone.

Stage Two, evaporates any water into its gaseous phase by thoroughly mixing droplets, or scrubbed air, into the receiving air stream to disperse uniformly, so that the water molecule concentration is adequate to assure contacting virtually all ozone molecules and achieve the ozone quench point molecular moisture ratio adequate for this purpose. This is the gas to gas reaction phase.

At exit, the leaving air is sensed with respect to its NOx content. NOx, a name applied to the multiple oxides of nitrogen, measurement is selected as the most practical method of determining ozone content, as direct measurements of ozone are very costly due to the oxidation potential of that gas. NOx is a simple, cost effective a reliable method of determining ozone produced by ionization of air. Reference is made to the respective ionization constants for these gases as a watt hour of ionization power will produce both 52 mg of ozone and 115 mg of nitrogen dioxide subject to the moisture content of the air being exposed to ionization radiation, or an electrostatic field.

Hence, any sensed nitrogen dioxide value read in ppm can be converted to an ozone concentration values by simply multiplying the NOx value by 93/167, equal to 55%. As an example, a NOx reading of 2 ppm will be converted to a 1.1 ppm ozone concentration.

Products of combustion from the introduction of contaminated ambient air might distort the measured value to create an artificially larger value of ozone. However, operating the invention with a NOx value which sets a larger ozone value errs on the side of safety becomes a desirable error as the incidental conversion of $NO_2$ to acid equally deals with $SO_2$, which frequently accompanies $NO_2$, as a product of combustion on the same acid formation basis.

While the invention is configured on a stand alone basis using the described NOx sensor algorithm, with exit levels of sensed gas as its operational setpoint, it is equally amenable to function upon receiving the output of other sensors which might reduce its operating costs.

Experimentation has shown that at controlled water molecule concentrations the contiguous molecular impacts between ozone molecules and water molecules permit the charge required to maintain the ozone molecule to bleed down through the grounded sheet metal enclosure which constitutes the geometry of a fog absorption chamber. Hence the invention encloses all of its components within a totally conductive metal panel housing which is grounded through not only its water feed line but the solid pressurized water column within the feed piping to assure the grounding path at lowest possible potential.

While 100% removal efficiency is virtually impossible the invention is controlled to setpoints which will meet the most stringent environmental regulations.

The successful performance of both stages are dependent on high rate mixing within each stage. While more classic industrial process equipment can be applied to these tasks, most of the scrubbing equipment is highly resistive to the flow of air and requires significant energy inputs which are not normally applicable to HVAC equipment. The separation of the two phases of cleaning into two low energy processes, as taught herein, makes the overall mechanical energy input to support these operations acceptably low. Hence, optimum for RAC service and advantageous with respect to what the HVAC industry offers as the alternate, dilution ventilation with high rates of ambient ventilation air. The invention becomes very energy use effective when compared to the annual heating and cooling costs of excessive quantities of cold or warm ambient air thermally conditioned to be introduced as make-up air applied to preclude the cycles-of-concentration accumulation of the cited contaminants of concern.

The ability of the invention to cool the return air flow being cleaned adequately meets the ASHRAE definitions of a "waterside" economizer and ASHRAE Standards also require that central HVAC systems include either a water, or air side economizer cycle to meet its energy use specifications.

The problem of airside economizer stratification for which many known "destratifiers" are available, is dealt with in the present invention by cooling the larger return air mass which dramatically reduces the quantities of cold ambient air which would otherwise be required for economizer cycle service.

The invention configured herein is a RAC with contaminated air removed from the occupancy of FIG. 1 functioning in the illustrated return air position and processed through a chamber which evaporates a controlled quantity of water into an air stream to react the ionized gases of concern which result from the operation of equipment (sources, per the language of the Standard) within the occupancy. Return air so treated can be returned for filtration and thermal conditioning within the system air handler unit and be reused to ventilate and adequately maintain a safe and habitable indoor air quality with acceptable levels of $O_3$ and $NO_2$, in accordance with the narrow range limits specified for compliance with the Standards tabulated values. Habitable, as defined by the Standard, also includes temperature control of the workplace which is specified as a 70 degree F. winter minimum and 78 degree F. summer season maximum with an accompanying 30% minimum to 60% maximum controlled humidity.

Within the RAC itself, a wide variety of mixers and moisteners can be applied to accomplish the unique tasks which compliance with the Standard entails.

These can be:

1. Wetted media, in the form of corrugated tray type fill, as commonly applied in cooling towers, although a wide variety of industrial packings (Rasching Rings, Saddles, etc.) could be applied equally well, as air saturation media as per FIG. 2 and its identified internal components.
2. Atomizers and/or spray nozzles with secondary target surface evaporators per FIG. 3, which add a dampered method for controlling leaving humidity and enhanced mixing characteristics for the gas to gas ozone reaction phase. Mechanical atomizers, spin discs or similar swirl centrifugal atomization mechanisms can be applied in a configuration very similar to that of FIG. 3.
3. UFG'S ultrasonic fog generators utilizing electronic transducers per FIG. 4 equipped with the control and mixing appurtenances of FIG. 2, for the required two phase cleaning of the through putted air stream.
4. Two phase, compressed air and water fed UFG's which use compressible flow principles to propagate high frequency oscillations which shatters water into ultrafine droplets per FIG. 5, but require no additional appurtenances for mixing and humidity control, the UFG's being high rate mixers and controllable with respect to a variable fog propagation rate.

Within FIGS. 2, 3, 4 and 5 are included the means for moisture addition, mixing and humidity control as required to meet the gas cleaning objective of the invention. All of these figures show devices which will respond to sensed gas signals by varying water feed rates and/or bypass dampers to accomplish the gas cleaning aspects of the invention.

While saturated air can be propagated and distributed, it should be understood that saturated air is unstable and subject to condensation which ASHRAE defines as a likely biofilm hazard problem. One can cite the commonly observed phenomenon of the tops of buildings being shrouded in mist while ground level is moisture free, as defining just how even a very small reduction in pressure allows free moisture to form. Hence, the invention must operate through its sense and control network to control exit humidity to a below saturation level to preclude the cited free moisture formation to avoid any downstream condensation which would form bio/film hazards. A biofilm hazard is defined as one which could provide a site for biological pathogens to colonize and propagate allergens and toxins which could be entrained and broadcast within the ventilation air stream.

DETAILED DESCRIPTION

FIG. 1 shows the general relationships of an HVAC system serving multiple occupancies wherein electronic equipment acts to ionize air to produce recognized hazardous gases whose level within the occupancies must be controlled to specific levels. Features of the invention are those designated for the air cleaner (return air) position hereafter denoted as RAC unit.

Figure 2:
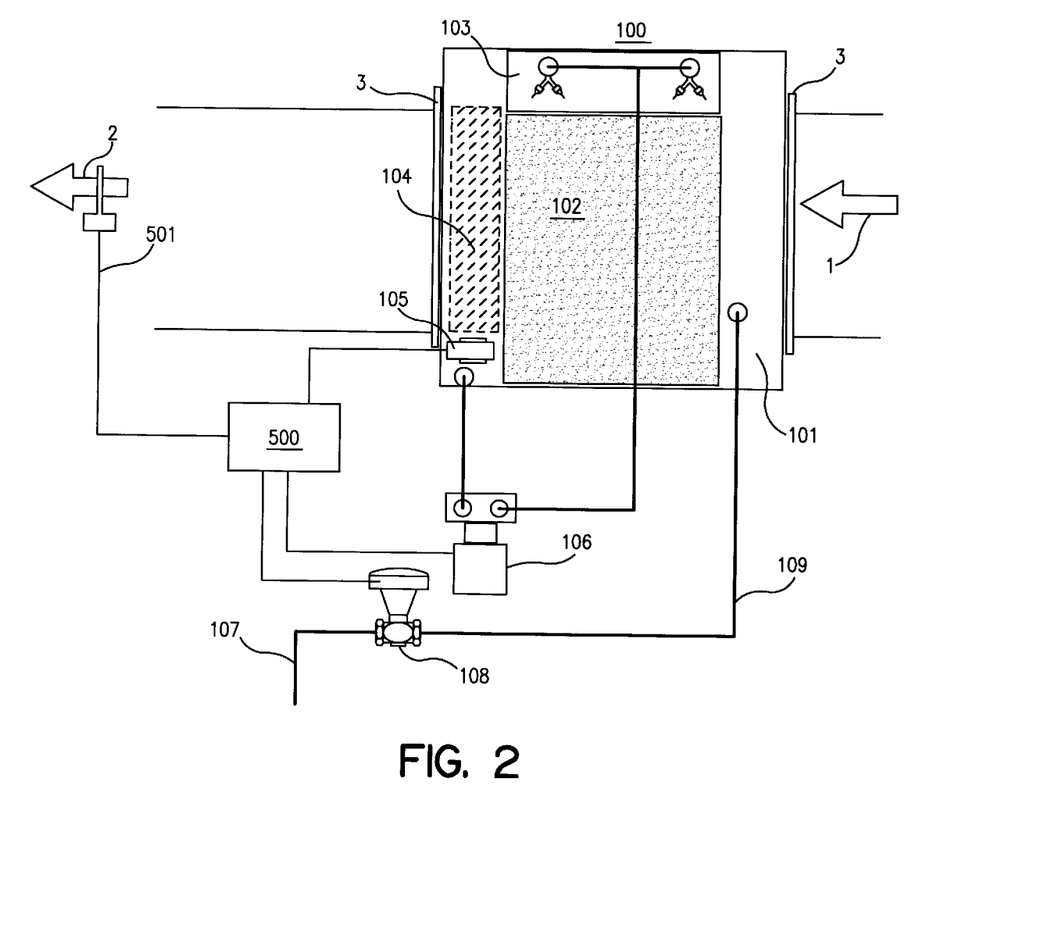
FIG. 2 shows an embodiment of the invention using gravity feed wetted media with recirculating sump.

FIG. 2 shows the RAC housing 100, equipped with drain and sump reservoir 101, receptive of contaminated air stream 01, being relatively rich in ionized gases of which ozone and nitrogen dioxide are the primary contaminants of concern. Elements of FIG. 2 are identified by the following reference numerals:

01-contaminated inlet air;
02-cleaned outlet air to HVAC system return;
03-duct flange connection;
100-return air cleaner housing;
101-water seal sump;
102-cellular, or packed fill wetted media;
103-water dispensing box, weir or spray distributor type;
104-drift free moisture eliminator;
105-level float control;
106-sump and circulation pump;
107-water feed supply;
108-water feed control valve;
109-air gapped sump water feed controlled line;
500-feedback controller;
501-leaving air quality sensor/sensors.

Housing 100 is secured to conveying ducting through inlet and outlet flanges 03. Airstream 01 is caused to flow through chamber or housing 100 a system fan. Housed within housing 100 is a bed of extended surface media 102. Media chamber includes water fill basin or water dispensing box 103, within which distribution nozzles are applied to uniformly distribute water across the fill surfaces. Often such devices utilize a perforated tray bottom to feed water droplets over the fill compartment.

The general principle is to wet the surfaces of the fill in a fashion adequate to moisten the air stream flowing through the fill by exposing it to direct contact with the combination of splashed droplets and extensive water filmed surfaces which result from gravity feeding, or spraying droplets onto irregular surfaced media, where such irregular surfaces become formed water and air passage cells, trays, or complex surfaces formed by packings. Such packings could also be rings, balls, or other formed objects through which air and water may flow in a turbulent, intimate contact manner.

A pump 106, draws water from sump 101 and delivers it to water box 103 components in a quantity well in excess of the airstream saturation rate. Hence, float level mechanism or level float control 105 provides signal to controller 500 which, in turn, activates water feed valve 108 to provide a controlled liquid level or water feed rate to maintain the sump level adequate for operations. Those familiar with this kind of equipment can readily apply one of the many available float and valve mechanisms, as familiar as toilet tank ball-cocks or their many equivalent feed water mechanisms, in lieu of the 500 & 108 combined function.

It is common to sequence fill sump 101, with a drift eliminator 104 intended to capture any free moisture droplets resulting from overspray carryover. Drift eliminator 104 is optional, as exit velocities can be engineered sufficiently low enough to preclude the entrainment of droplets. Those familiar with such media characteristics are capable of making the engineering judgments as to when to apply fill with and without the drift eliminator. In general, drift eliminators 104 are available as mesh pads, lattice, or chevron type vane Z-bend louvers fabricated in materials suitable to resist the corrosive saturated air environment in which they are intended to function.

Those who are familiar with such air washing treatments, are equally aware of the controlled flush and dilution needs of sumps whose water chemistry is affected by evaporation and the accumulation of impurities, hence no detailed explanation of these are required within this description, other than to state that such common known art principles are applicable.

The nitrogen dioxide component of air stream 01, upon water contact reacts to become nitric acid which remains in solution within the water and the cleaned air, at saturation condition exits through the eliminator to flow past exit gas, leaving air quality sensor previously discussed.

The molecular ozone content of the partially cleaned air will, over time, contact a satisfactory quantity of water molecules whose continuing molecular contacts will, whenever a continuous path is formed, allow the positive charge carried by the ozone molecule to be grounded against the metal housing 100 and the exiting duct path.

Grounding, as previously discussed, provides the electron path to break down the ozone into the oxygen molecules from which ozone was formed during the ionization of ambient air by process and equipment within the occupancy from which air stream 01 has been drawn. Downstream of the unit is placed a NOx, $NO_2$ or specific gas sensor 501 connected by signal cable to controller 500 which acts to activate pump 106, in response to the detection of ozone within the exiting cleaned air, 02 flow stream. Sensor 501 must be installed at a distance adequate to allow elapsed time and sufficient downstream length to assure that adequate ozone mitigation has occurred. Enhancements to increase the turbulent mixing for installations wherein there is inadequate time for complete mixing are illustrated in the following drawings.

Figure 3:
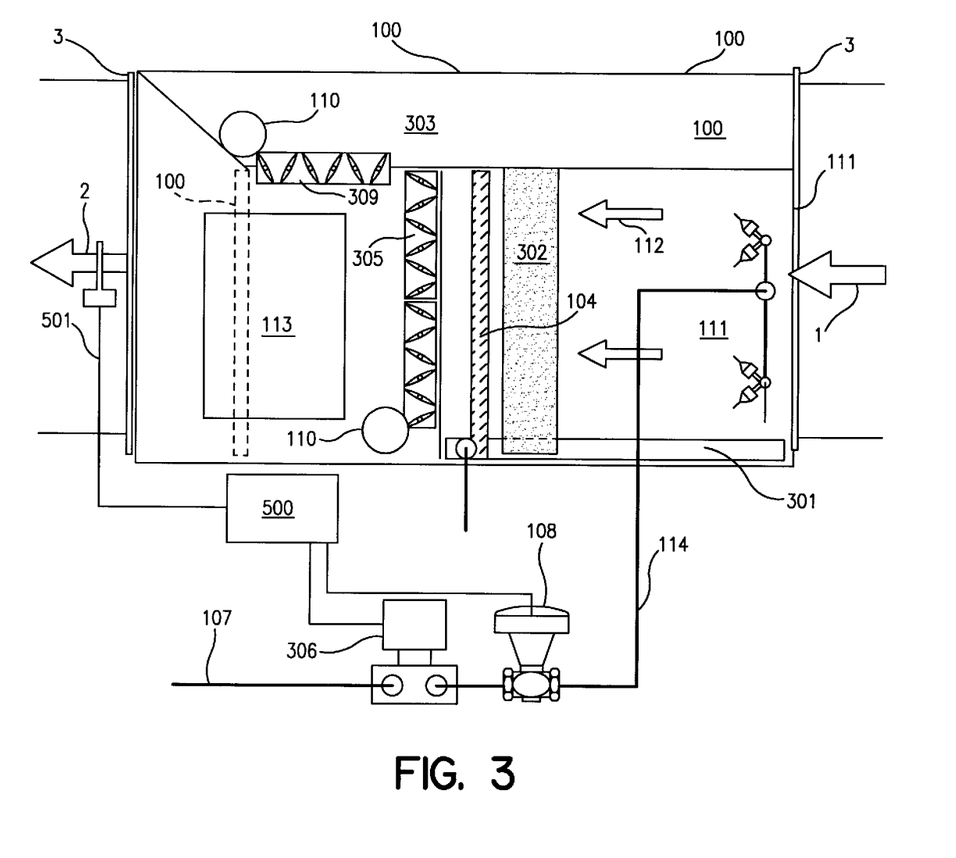
FIG. 3 show the stage one water pressure spray nozzle with stage 2 mixing section.

FIG. 3 diagrams a return air cleaner including housing 100 with drain pan 301 and internal baffle or partition 303 configured to create a bypass flow of contaminated air 01 drawn through the unit. Airflow thusly proceeds through the spray moistening segment and around it. Elements of FIG. 3 are identified by the following reference numerals:

- 01-contaminated inlet air;
- 02-cleaned outlet air to HVAC system return;
- 03-duct flange connection;
- 100-return air cleaner housing;
- 301-water drain pan;
- 302-cellular wetted media spray pads;
- 303-bypass chamber partition;
- 104-drift free moisture eliminator;
- 305-face damper;
- 306-pressure pump;
- 107-water feed supply;
- 108-water feed control valve;
- 309-bypass damper;
- 110-damper actuator (optional);
- 500-feedback controller;
- 501-leaving air quality sensor/sensor;
- 111-atomizing nozzles;
- 112-stage 1 cleaned air;
- 113-access door;
- 114-controlled nozzle feed line.

Moisture addition is provide by pressure spray atomizing nozzles 111, as are well known to the industry. Nozzles 111 are configured in a bank to uniformly saturate the air stream flowing through to create a uniform field of evaporating droplets well mixed with the receiving air stream and saturate downstream or media pads secondary evaporation pads or media pads 302.

Wetted pads consist of cellular elements having extensive fibrous passages having relatively small resistance to the flow of the air passing through the cellular elements while assuring a close approach to the saturation point of the air. Between droplet contact within the transitional zone of 112 and the capillary attractive surfaces of the cell fibers of evaporation pads 302, nitrogen dioxide molecular contaminants are water contacted to remove the gas from the air by dissolving it within the water surfaces and draining any non-evaporated water from media pads 302 and overspray drift eliminators 104, both of which are seated within drain pan 301.

Spray nozzles 111 utilize water pressure for atomization, which for this application are best delivered as fine droplets expelled at reasonably high velocity to encourage dispersion and a pressure pump 306 is selected commensurate with the hydraulic engineering of the nozzles. Pump discharge water is applied through control valve 108 which acts as automatic shutoff and where the selected nozzles are sophisticated enough, volumetric control of the applied water rate achieved through controlled pressure throttling of nozzle feed line 114. Where water pressure is adequate no pump is required. Pump 306 can be controlled through a variable frequency, or its like speed control which permits a variable flow rate.

Face damper 305 and bypass damper 309 are sized and controlled to limit the humidity of the mixed air steam as sensed in the exiting airstream 02 under control of sensor 501. The technique of face & bypass damper control is well known to HVAC design practitioners and while the dampers are shown within the leaving paths, they could function equally well in the inlet paths.

However, the position shown within FIG. 3 is optimum to enhance the mixing rate to assure that molecular ozone is contacted by the water molecules of the saturated airstream leaving overspray eliminator 104. Application of properly engineered dampers uses aperture between the damper blades to increase jet velocity through them to force mixing of the respective airstreams. Design of mixing damper networks for temperature control are well known and these same principles are readily applicable here. While the dampers applied here may be mechanically locked, they can also be positioned by damper motor actuators 110, which, through linkages can position the dampers under the control of controller 500 which can provide either electronic or pneumatic positioning of the respective face and bypass dampers 305 and 309.

While not illustrated, the industry often chooses to apply engineered orifice plates for flow control and subsequent mixing. Generally such orifice plates are fabricated with relatively small drilled holes or engineered slots to establish many small mixing jets with engineered orifice velocities which vary with the design pressures of the separated flow stream compartments. Common configurations use the one shown in FIG. 3 although there are many well known variations.

However, applications frequently use one damper in conjunction with an orifice plate, two orifice plates and where extreme sophistication, as for some intermittent pollutant sources both dampers with actuators and orifice plates are applied. Inclusion of the aforementioned mixing control and devices to accomplish quick mix makes the RAC unit independent of downstream geometry for ozone destruction as sensed by sensor 501, positioned within cleaned air leaving flowstream 02 exiting the unit.

Feedback controller 500 through the control of pump 306, control valve 108 and mixing dampers can respond with variable scrubbing rates to hold the setpoints of controller 500, as measured through leaving air sensor 501. This degree of sophistication is required as most HVAC systems use VAV (variable-air-volume) control, meaning that inlet air 01 and its ionized gas content, to be cleaned varies with the thermal heat gain characteristics of the occupancies heated, cooled and ventilated by the system.

Hence, substantial variations in air quantity and related concentrations of the pollutants of concern cited within the Standard can be dealt with by applying the feedback control network and control devices.

Figure 4:
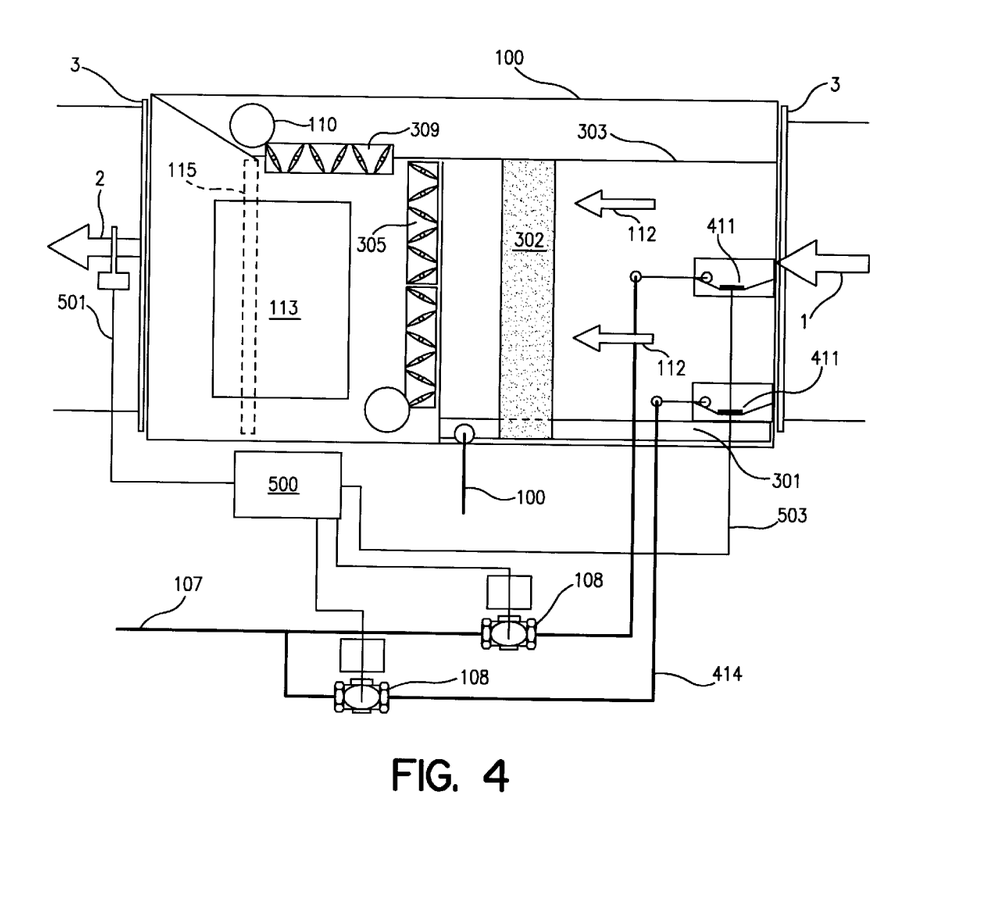
FIG. 4 shows the return air cleaner with stage 1 piezo electronic transducers and stage 2 mixing section.
Figure 5:
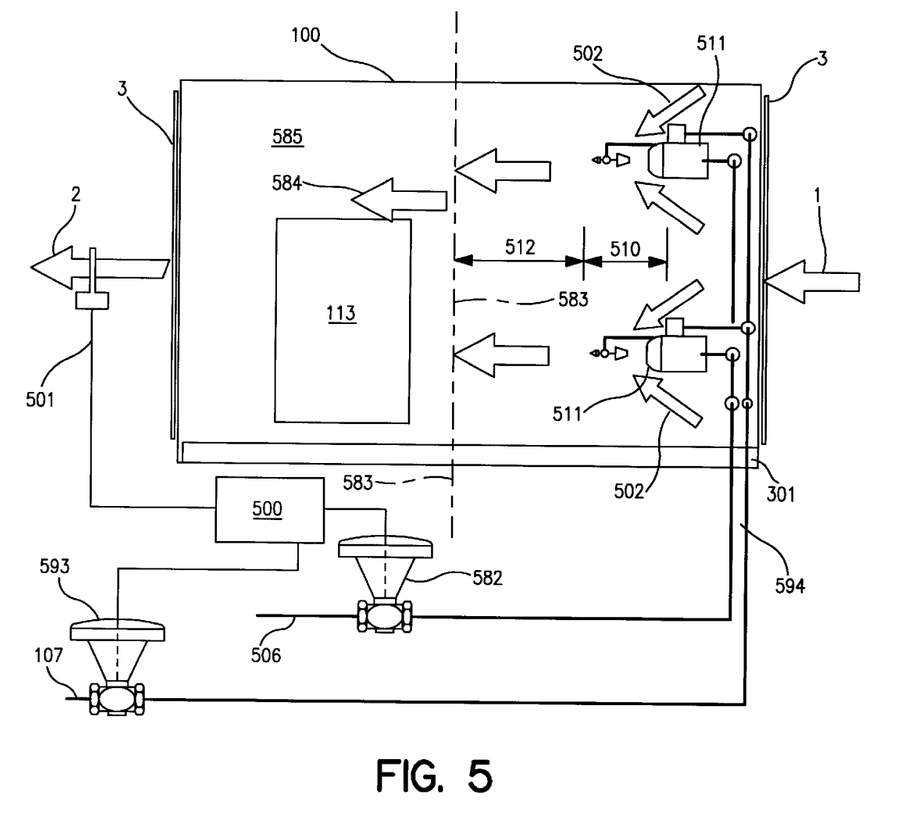
FIG. 5 shows the return air cleaner with high induction two phase UFGs.
Figure 6:
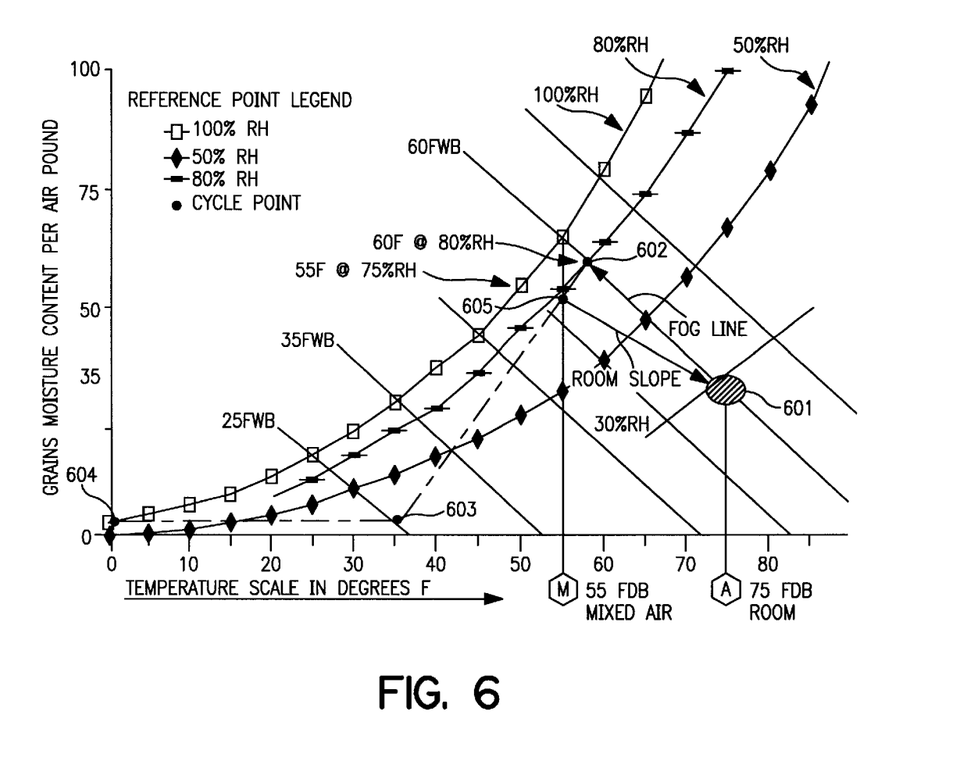
FIG. 6 shows a phased gas-to-gas psychometric system process representation for ozone controlled return air cleaning.
Figure 7:
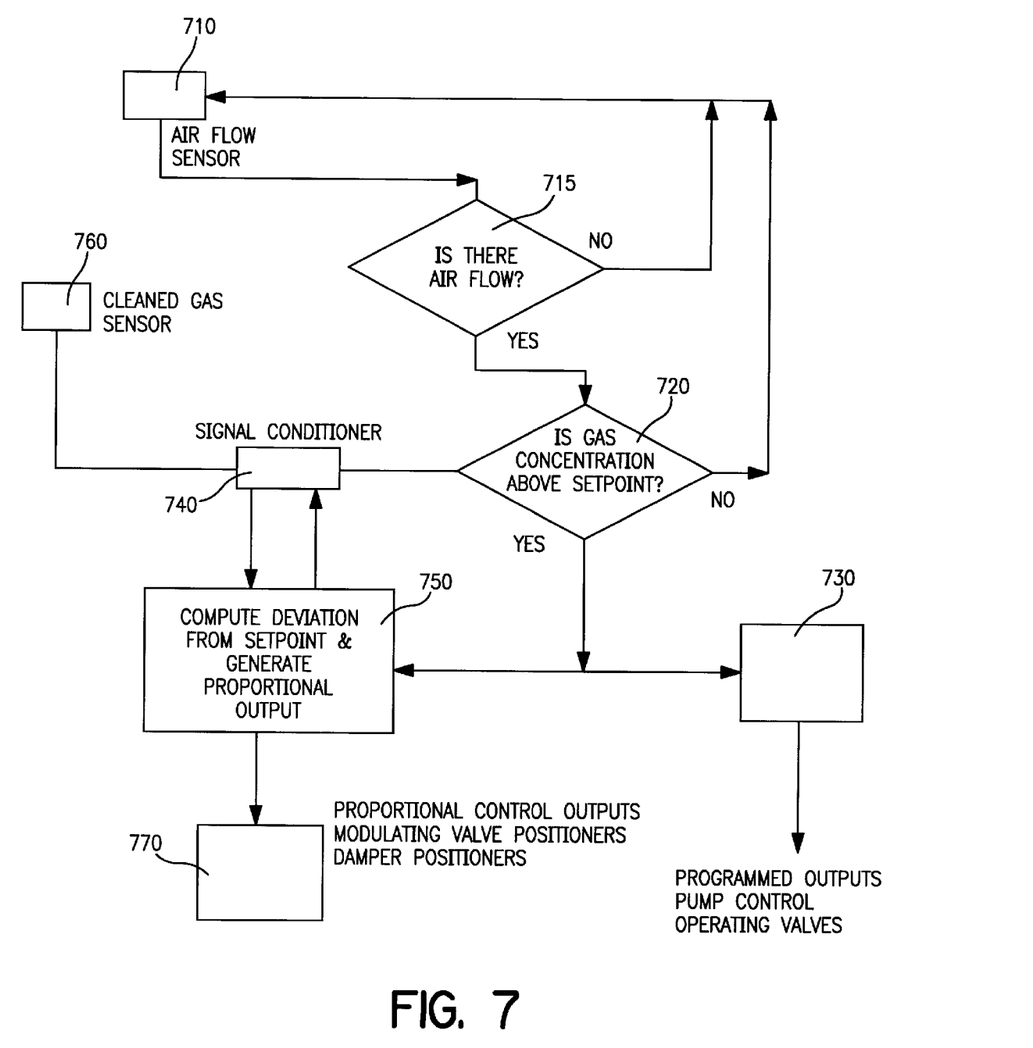
FIG. 7 shows a flow diagram of set point control.

FIG. 4 diagrams a RAC configuration which applied single phase UFG's (ultrasonic-fog-generators) which are reliant upon piezoelectric transducer discs, which oscillate as a function of applied electrical frequency. Where these discs are submerged within, a shallow tray (411), the transducers agitate the water layer so violently that very small droplets are caused to break away from the water surface and into the air stream as fine through ultrafine droplets. The droplets size varies with the applied electronic frequency. Elements of FIG. 4 are identified by the following reference numerals:

01-contaminated inlet air;
02-cleaned outlet air to HVAC system return;
03-duct flange connection;
100-return air cleaner housing;
301-water drain pan;
302-cellular wetted media spray pads;
303-bypass chamber partition;
305-face damper;
107-water feed supply;
108-water feed control valve/valves;
109-bypass damper,
110-damper actuator (optional);
411-UFG piezo transducers in trays;
112-stage 1 cleaned air;
113-access door;
414-controlled UFG feed line/lines;
115-diffusion mixing element;
500-feedback controller;
501-leaving air quality sensor/sensors;
503-UFG excitation controller.

Generally lower frequency produces larger droplets and the higher frequencies droplets which are small and light enough to allow them to be carried away by inlet air 01 which is caused to move over the exposed water surfaces of a multiplicity of shallow trays. These are single phase electronic UFG's which are normally applied in a modular distribution designed to uniformly saturate a cross section, and controlled through electronic sequencers through the action of a feedback controller.

Droplet production by electronic UFG's are considered a low kinetic energy droplet source because most of the transducer energy is dissipated in breaking the surface tension forces to shake droplets free of the surface film and this creates the need for adding turbulence by the positioning of the transducer tray elements into multiple rows as shown. Since water pressure requirements are only those required to flood shallow trays of 411, in general, no pump is required.

Each tray assembly is usually equipped with integral level control, although those fill functions can also be applied by controller 500 and sensor 501 with outputs to feed water control valves 108, frequency generators driving transducers of tray 411 and the downstream drift eliminator 104 and mixing devices, as discussed and identified for FIG. 3. Each of FIGS. 2, 3 and 4, deal sequentially with nitrogen dioxide and water surface Stage 1 contacts and sequential stage 2, gas to gas phase reaction of the ozone molecule content of the contaminated air stream by forced-turbulent mechanical mixing devices to satisfy the overall definition of the invented RAC (Return-Air-Cleaner) with respect to function and configuration of the previously identified and discussed dampers.

FIG. 5, illustrates the required configuration using two phase UFG's. Elements of FIG. 5 are identified by the following reference numerals:

01-contaminated inlet air;
02-cleaned outlet air to HVAC system return;
03-duct flange connection;
100-return air cleaner housing;
301-water drain pan;
502-UPC induced air;
583-ETD completion zone;
584-ozone residual air;
585-ozone reaction zone;
506-compressed air supply;
107-water feed supply;
582-compressed air control valve;
593-water control valve;
594-controlled compressed air and water UFG feedlines;
510-stage 1, droplet mixing zone;
511-induction mixing UFG's;
512-stage 2 gas-to-gas mixing zone;
113-access door;
500-feedback controller;
501-leaving air quality sensor/sensors.

A two phase UFG functions using compressed air and water. Compressed air expanded through an orifice is a well known water shearing mechanism which also applies the kinetic energy of the discharge jet to project water droplets at relatively high velocity to broadcast these in the form of a plume distribution of droplets projected into the receiving air stream. UFT's without resonators are classified as pneumatic atomizers and lack the quick mix potential of resonator equipped UFG's. While UFG's (ultrasonic-fog-generators) which are engineered for high secondary air induction mixing rates are most favorable to the RAC application, the very broad variety equipment cited above and well known to both the HVAC and pollution control scrubbing industries are equally applicable, providing that they fulfill the Stage 1 & 2 aforementioned criteria and have a water feed rate control, or adequate control of the humidity leaving the RAC.

FIG. 5 illustrates a multiplicity of UFO's 511 housed within the entry of housing 100 mounted upon drain pan 301 and coupled into a duct path through and flanges 03. UFO's 511 are positioned for cross flow across the entry of contaminated air 01 conveyed from an occupancy within which pollutant sources function, configured to deliver a uniform fog field or mixing zone 512 at the unit entry plane. Fog field 512 results from the high rate entrainment of entering air 01 into the mixed flow jet emerging from the UFG at velocity at least equal to MACH ONE. UFG 511 is receptive of compressed air via pipeline 594 and pressurized water line or water feed supply 107 as controlled by modulating valves 582. and 593 respectively. Valves 582 and 593 are controlled in a manner which drives them in a programmed manner from signals propagated by controller 500 which is receptive of signals from exit path sensor 501 measuring concentrations of gases. Controller 500 may be responsive to a series of gases, or multiple sensor elements and is capable of generating outputs to the valves to satisfy setpoints programmed into the controller itself.

Water supply line 107 is derived from a domestic water supply. The water, as it will be added to breathing air through the ventilation supply must be suitable for human consumption. Lines 506 and 107 are coupled to control system valves 582 and 593 are fed from the building services for compressed air use and water requirements. While no pressurization pump is shown, it will be understood that UFG'S operating with 5 to 10 Bar compressed air pressures require water pressurized to levels equal to those of the compressed air flow and often these are greater than those common to domestic water supplies.

While the UFG of U.S. Pat. No. 5,454,518 is particularly well suited to the application because of the engineered efficiency of the flat reflection face sited within a domed surface induction head, specific features which, in conjunction with the tapered discharge resonator tip act as an unhoused (open) Bernoulli type venturi or like devices.

All of these feature, when so combined, act to volumetrically induce about 700 ACFM of entering air for each SCFM of compressed air expanded to atmospheric pressure through the UFG. While the volumetric roll over rate is 700:1, induction by weight is only 250 pounds/hour of RAC throughput, per compressed air pound expanded through the UFG.

These ratios can be increased further by increasing both compressed air and water applied pressures, although the cited ones are adequate for the task. In general, an increase in applied pressure increases the discharge velocity and its kinetic energy, a function of the square of the velocity. The receiving air 01 is induced into the UFG discharge jet as a function of the kinetic energy carried by the jet stream. Hence, the higher the discharge jet velocity, the greater the mixing rate between emerging droplets and induced contaminated air to form fog field 112 and requires only about 1/3 of a second downstream travel time within the unit housing for the required ozone quenching reaction without the elaborate mixing damper configuration.

This mixing mechanism is important because it serves to assure the initial contact between droplet and nitrogen dioxide and a rapid three dimensional divergence of the droplets well mixed within air at temperatures close to 70° F. as air stream 01, from an occupancy will be. The droplets, already in turbulent motion, absorb heat from the surrounding air and boil rapidly through the large exposed surface area of a droplet when compared with its relatively small weight.

The higher the mixing rate, the more rapid the boiling, and at the rates cited above the droplets disappear in flash cooling the receiving air to about 60° F.

In flashing a pound of liquid volumetrically goes from 0.016 $FT^3$/pound to almost 1,000 $FT^3$/pound so that the gross expansion rate of the droplet, by weight can be computed as the cross product of 250 times (1,000/0.016). Within these parameters the perfect gas laws become applicable with each gaseous phase component occupying the entire available volume in direct relationship to the respective partial pressures of each gas component (Charles Law). It is this explosive volumetric mixing which assures uniform molecular contact which in-turn assures the destruction of the ozone molecule.

While a broad family of UFG's are available not all exhibit secondary air induction. Any drop off in mixing rate requires the engineering of either a larger chamber with respect to direction of flow to increase the contact time, or the inclusion of adequate airstream devices to increase the turbulence, as were discussed in explaining FIGS. 2, 3 and 4 for more rapid mixing to match the high performance UFG's, or a combination of the two where pneumatic atomizers are applied. Those skilled in HVAC design are equipped, e.g. through the teachings of the referenced patent, with the basic knowledge to make determinations as to power requirements for forcing flow through mixing configurations or providing a suitable compressed air supply to allow a UFG to provide the mixing power.

FIG. 6 illustrates a psychrometric process for the invented RAC, in any of the embodiments defined in FIGS. 2, 3, 4 and 5. FIG. 6 shows grains of moisture content per pound of air as a function of temperature, with curves being shown for 50%, 80%, and 100% relative humidity. The round black dots, connected by arrows, show the points of a psychrometric cycle. Elements of the graph of FIG. 6 are identified by the following reference numerals:

601-return air (ranges from 72 to 78 FDB within a 30 to 50% RH range);

602-fogged to 80% RH minimum and controllable ozone level set point;

603-minimum O.A. preheated to between 30 to 35 FDB frost point control;

604-winter ambient intake ventilation air 0 FDB @50% RH;

605-mixed air at 55FDB control point as determined by preheat controller.

In FIG. 6 there is shown adiabatic cooling within the RAC and the relationship of the RAC into the overall aspects of the system into which it is integrated. The end product of the air handler is a gas cleaned into a safe air supply to the occupancy state.

In the flow diagram of FIG. 7, 710 is an air flow sensor, and when air flow is detected (decision block 715), determination is made (decision block 720) as to whether the gas concentration is above the set point. If not, the block 710 is re-entered. If, however, the gas concentration is above the set point, an output is provided to the blocks 730 and 750. The block 730 produces programmed outputs for the pump control operating Valves. The block 750 represents computation of the deviation from the set point, and, accordingly, generation of proportional output. This output is coupled to the block 770, which represents the function of the proportional control outputs which modulate valve positioners, and damper positioners, as indicated. The cleaned gas sensor is represented at 760, and the output thereof is coupled to signal conditioner 740, whose output is, in turn, coupled with the block 720, which, as previously described, determines if the gas concentration is above the set point. The signal conditioner is also coupled with the block 750, as shown.

Those familiar with HVAC work will recognize that most air handlers provide a uniform air supply distribution near to 55° F., in a quantity sufficient to offset the heat gains of internally occupied space. These heat gains are mainly from lighting, office equipment and people. Where the air supply requires heating to offset the affects of cold walls and windows, zone or perimeter heating elements are applied.

While not specific to the invention itself, the Standard also defines the quantity of ambient air introduced for the freshening of the supply air mass as 20 CFM per occupant and assumes seven occupants per 1,000 Sq. Ft. These factors in conventional HVAC design come to about 140 CFM per person of which 15% must be ambient air sourced. Hence, 15% of ambient air at winters extreme 0° F. is illustrated as the ventilation rate within FIG. 6. The Standard is specific to these documented safe values as those which exclude, other than normal biological emissions and cites how and why these ventilation rates must be increased to control sources of contaminants such as the ionized gases for which the RAC is invented.

Those sufficiently familiar with both psychometric processes and the relationship with ambient air increasing temperature which generally are accompanied by an increase in moisture content, will recognize that this also will result in a rising RH within the occupancy. While this is an advantage with respect to the propagation of ionized gases within the occupancy, it also imposes the need to carefully control the moisture propagation rate of the RAC as provided for herein through the integration of humidity control.

Hence, the RAC must also include metering control of the moisture feed within the RAC, as well as commonly applied HVAC engineering dehumidification processes within the air handling unit.

In time of poor or dangerous ambient air quality, environmental safety officials advise that those with respiratory problems take shelter within an air conditioned room. Hence, through its controls the RAC should be made synergistic to the building HVAC system operation.

What is claimed is:

1. For use in conjunction with a Heating, Ventilating, and Air Conditioning (HVAC) system that receives an input air stream in a return air-path that is contaminated with nitrogen dioxide and ozone, an apparatus comprising:

a module for insertion in the return air path for cleaning the input air stream, prior to recirculation within the HVAC system, including:

a first processing stage, which includes a fogging array of fogging transducers, for receiving said input air stream, said first stage being operative to introduce water as uniformly dispersed fog and cause water droplets to mix with said air stream whereby nitrogen dioxide reacts with said water droplets;

a second evaporative mixing stage, said second stage including means operative to inductively mix water droplets through said air stream to flash in a gas-to-gas dry process reaction to dissociate ozone in said air stream as it comes into contact with molecular water vapor in said air stream;

an air flow chamber enclosure enclosing said first and second stages, null-voltage grounded with respect to electrical service and electrostatic potentials;

means downstream of said first and second stages for scrubbing from said air stream nitric acid vapors that resulted from said reaction of nitrogen dioxide with water droplets;

feedback control means, responsive to a set point of contaminant concentration in cleaned return air, for controlling the fogging array of said first processing stage;

whereby, gas-to-gas dry process reaction is implemented to reduce nitrogen dioxide and ozone contaminants to set point controlled levels in the return air.

2. The module as defined by claim 1, wherein said fogging transducers are electronically excited fogging transducers submerged in at least one water tray.

3. The module as defined by claim 1, wherein said fogging transducers are ultrasonic fogging transducers that are fed compressed air and water under controlled pressure.

4. The module as defined by claim 3, wherein said feedback control means is operative to control said compressed air and water pressure.

* * * * *